United States Patent
Bou-Ghannam et al.

(10) Patent No.: US 9,201,714 B2
(45) Date of Patent: *Dec. 1, 2015

(54) APPLICATION MODULE FOR MANAGING INTERACTIONS OF DISTRIBUTED MODALITY COMPONENTS

(75) Inventors: Akram A. Bou-Ghannam, Lake Worth, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/977,671

(22) Filed: Dec. 23, 2010

(65) Prior Publication Data

US 2011/0093868 A1   Apr. 21, 2011

Related U.S. Application Data

(63) Continuation of application No. 12/163,052, filed on Jun. 27, 2008, now Pat. No. 7,882,507, which is a continuation of application No. 10/741,997, filed on Dec. 19, 2003, now Pat. No. 7,409,690.

(51) Int. Cl.
| | |
|---|---|
| G06F 3/00 | (2006.01) |
| G06F 9/44 | (2006.01) |
| G06F 9/46 | (2006.01) |
| G06F 9/54 | (2006.01) |

(52) U.S. Cl.
CPC .............. *G06F 9/542* (2013.01); *G06F 9/4443* (2013.01); *G06F 2209/544* (2013.01); *G06F 2209/545* (2013.01)

(58) Field of Classification Search
None
See application file for complete search history.

(56) References Cited

U.S. PATENT DOCUMENTS

| | | | |
|---|---|---|---|
| 5,748,974 A | 5/1998 | Johnson | |
| 5,872,274 A | 2/1999 | Cannady et al. | |
| 5,878,274 A * | 3/1999 | Kono et al. | ........................ 710/8 |
| 6,104,803 A | 8/2000 | Weser et al. | |
| 6,405,317 B1 | 6/2002 | Flenley et al. | |
| 6,529,863 B1 | 3/2003 | Ball et al. | |
| 6,763,397 B1 * | 7/2004 | Bracha et al. | .................. 719/332 |
| 6,778,990 B2 * | 8/2004 | Garcia et al. | .................. 719/315 |
| 6,859,451 B1 | 2/2005 | Pasternack et al. | |
| 6,990,513 B2 | 1/2006 | Belfiore et al. | |
| 7,069,560 B1 | 6/2006 | Cheyer et al. | |

(Continued)

OTHER PUBLICATIONS

Marazakis et al, The Aurora Architecture for Developing Network-Centric Applications by Dynamic Composition of Services, University of Crete and Institute of Computer Science, FORTH, pp. 1-51, 1997.*

(Continued)

*Primary Examiner* — Diem Cao
(74) *Attorney, Agent, or Firm* — Wolf, Greenfield & Sacks, P.C.

(57) ABSTRACT

A method for managing application modalities using dialogue states can include the step of asserting a set of activation conditions associated with a dialogue state of an application. Each of the activation conditions can be linked to at least one programmatic action, wherein different programmatic actions can be executed by different modality components. The application conditions can be monitored. An application event can be detected resulting in an associated application condition being run. At least one programmatic action linked to the application condition can be responsively initiated.

19 Claims, 4 Drawing Sheets

(56) References Cited

U.S. PATENT DOCUMENTS

| | | | |
|---|---|---|---|
| 7,401,337 | B2 | 7/2008 | Bou-Ghannam et al. |
| 7,409,347 | B1 | 8/2008 | Bellegarda |
| 7,409,349 | B2 * | 8/2008 | Wang et al. ............... 704/270.1 |
| 7,409,690 | B2 | 8/2008 | Bou-ghannam et al. |
| 7,711,570 | B2 * | 5/2010 | Galanes et al. ............... 704/277 |
| 7,882,507 | B2 | 2/2011 | Bou-Ghannam et al. |
| 8,095,939 | B2 | 1/2012 | Bou-Ghannam et al. |
| 8,352,962 | B2 | 1/2013 | Bou-Ghannam et al. |
| 2002/0015064 | A1 | 2/2002 | Robotham et al. |
| 2002/0178344 | A1 * | 11/2002 | Bourguet et al. ............... 712/1 |
| 2003/0005174 | A1 | 1/2003 | Coffman et al. |
| 2003/0046346 | A1 | 3/2003 | Mumick et al. |
| 2003/0093419 | A1 | 5/2003 | Bangalore et al. |
| 2003/0182125 | A1 | 9/2003 | Phillips et al. |
| 2003/0187944 | A1 | 10/2003 | Johnson et al. |
| 2004/0117804 | A1 | 6/2004 | Scahill et al. |
| 2007/0250841 | A1 * | 10/2007 | Scahill et al. ............... 719/320 |
| 2013/0014125 | A1 | 1/2013 | Boughannam et al. |
| 2013/0014129 | A1 | 1/2013 | Bou-Ghannam et al. |
| 2013/0014130 | A1 | 1/2013 | Bou-Ghannam et al. |
| 2013/0018998 | A1 | 1/2013 | Boughannam et al. |

OTHER PUBLICATIONS

Djenidi et al., "Dynamic Based Agent Reconfiguration of Multimedia Multimodal Architecture," Proceedings of the IEEE Fourth International Symposium on Multimedia Software Engineering (MSE'02), 2002, pp. 1-8.

W3C, "Multimodal Interaction Requirements," Jan. 8, 2003, pp. 1-39.

Yang et al., "Smart Sight: A Tourist Assistant System," 1999.

Amann et al. "Position Statement for Multi-Modal Access," Nov. 26, 2001, pp. 1-16.

* cited by examiner

APPLICATION MODULE FOR MANAGING INTERACTIONS OF DISTRIBUTED MODALITY COMPONENTS

CROSS REFERENCE TO RELATED APPLICATIONS

This application is a continuation of, and accordingly claims the benefit under 35 U.S.C. §120 of, U.S. patent application Ser. No. 12/163,052, now issued U.S. Pat. No. 7,882,507, which was filed in the U.S. Patent and Trademark Office on Jun. 27, 2008, and which is herein incorporated by reference in its entirety. U.S. patent application Ser. No. 12/163,052 is a continuation of, and accordingly claims the benefit under 35 U.S.C. §120 of, U.S. patent application Ser. No. 10/741,997, now issued U.S. Pat. No. 7,409,690, which was filed in the U.S. Patent and Trademark Office on Dec. 19, 2003, and which is herein incorporated by reference in its entirety.

BACKGROUND

1. Field of the Invention

The present invention relates to the field of computer software and, more particularly, to multimodal applications.

2. Description of the Related Art

A multimodal application is an application that permits user interactions with more than one input mode. Examples of input modes include speech, digital pen (handwriting recognition), and the graphical user interface (GUI). A multimodal application may, for example, accept and process speech input as well as keyboard or mouse input. Similarly, a multimodal application may provide speech output as well as visual output, which can be displayed upon a screen. Multimodal applications can be particularly useful for small computing devices possessing a form-factor that makes keyboard data entry more difficult than speech data entry. Further, environmental conditions can cause one interface modality available in a multimodal application to be preferred over another. For example, if an environment is noisy, keypad and/or handwritten input can be preferred to speech input. Further, when visual conditions of an environment, such as darkness or excessive glare, make a screen associated with a computing device difficult to read, speech output can be preferred to visual output.

Although users of small computing devices can greatly benefit from multimodal capabilities, small computing devices can be resource constrained. That is, the memory and processing power available to a small computing device can be too limited to support the local execution of more than one mode of interaction at a time. To overcome resource constraints, multimodal processing can be distributed across one or more remote computing devices. For example, if one mode of interaction is speech, speech recognition and synthesis processing for the speech mode can be performed upon a speech-processing server that is communicatively linked to the multimodal computing device. Software developers face a significant challenge in managing distributed multimodal interactions, some of which can be executed locally upon a computing device, while other interactions can be executed remotely.

Conventional solutions to distributed multimodal interaction management have typically been application specific solutions that have been designed into an application during the application's software development cycle. Accordingly, the features available for each modality, such as speech recognition features, are typically tightly integrated within the software solution so that future enhancements and additional features can require extensive software rewrites. Because hardware and software capabilities are constantly evolving in the field of information technology, customized solutions can rapidly become outdated and can be costly to implement. A more flexible, application-independent solution is needed.

SUMMARY OF THE INVENTION

The present invention provides a method, a system, and an apparatus for managing a multimodal application using a set of activation conditions and data placed on a shared memory area, where a set of activation conditions is defined by an application developer. More specifically, the application can be delivered to a thin client that can lack the computing resources to simultaneously support multiple modalities. Each input modality supported by the application can be handled by a modality component. The activation conditions defined for the application can be used to selectively activate and deactivate different modality components as needed to perform input recognition and output synthesis, as well as interpret data submitted by multiple modality components for complex multimodal interactions.

In one embodiment, computing resources of the thin client can be conserved by distributing operations of one or more modality components across one or more remote servers communicatively linked to the thin client. A modality component server can centrally manage modality components, regardless of whether the modality components are executing upon the thin client or are executing upon a remote server. The modality component server can utilize different application states published by the multimodal application to detect interaction events and to run the activation conditions of the various modality components as appropriate.

One aspect of the present invention can include a method for managing application modalities using a set of author-defined activation conditions and data. The combination of activation conditions and data determine the dialogue state of an application. Each of the activation conditions can be linked to at least one programmatic action, where different programmatic actions can be executed by different modality components. In one embodiment, the programmatic action can be a modality component action executed remotely from the application. The role of the application module is to monitor the activation conditions. An occurrence of one of the activation conditions can be detected based upon an application event. At least one programmatic action linked to the occurrence can be responsively initiated. In one embodiment, a modality manager that is remotely located from the application can be provided. The application conditions for the dialogue state can be asserted, monitored, detected, and initiated by the application module.

In a particular embodiment, the method can be used to determine that the application changes from the original dialogue state to a new dialogue state. The dialogue state change can result from the execution of the programmatic action. A new set of activation conditions are asserted in response to the new dialogue state. The activation conditions that are monitored and used to initiate programmatic actions can be updated to reflect the new set of application conditions.

In another embodiment, the modality component can be activated before the set of activation conditions has been determined for the dialog state. The activated component can assert a multitude of activation conditions, and the new set of activation conditions can update the dialogue state. When the application changes to a new dialogue state, the previously activated modality component can be deactivated. This deactivation can cause the multitude of activation conditions previously asserted by the deactivated modality component to be not included in a new set of activation conditions associated with the new dialogue state. Additionally, the change to the new dialogue state can result in the activation of a previously deactivated modality component. The activation conditions associated with the newly activated modality component can be included in the new set of activation conditions associated with the new dialogue state.

In still another embodiment, a set of activation conditions can be loaded into a centralized memory space. The monitoring for events triggering activation conditions can involve the centralized memory space. In such an embodiment, when the application changes from one dialogue state to a new dialogue state, the centralized memory space can be updated to reflect the activation conditions of the new dialogue state.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
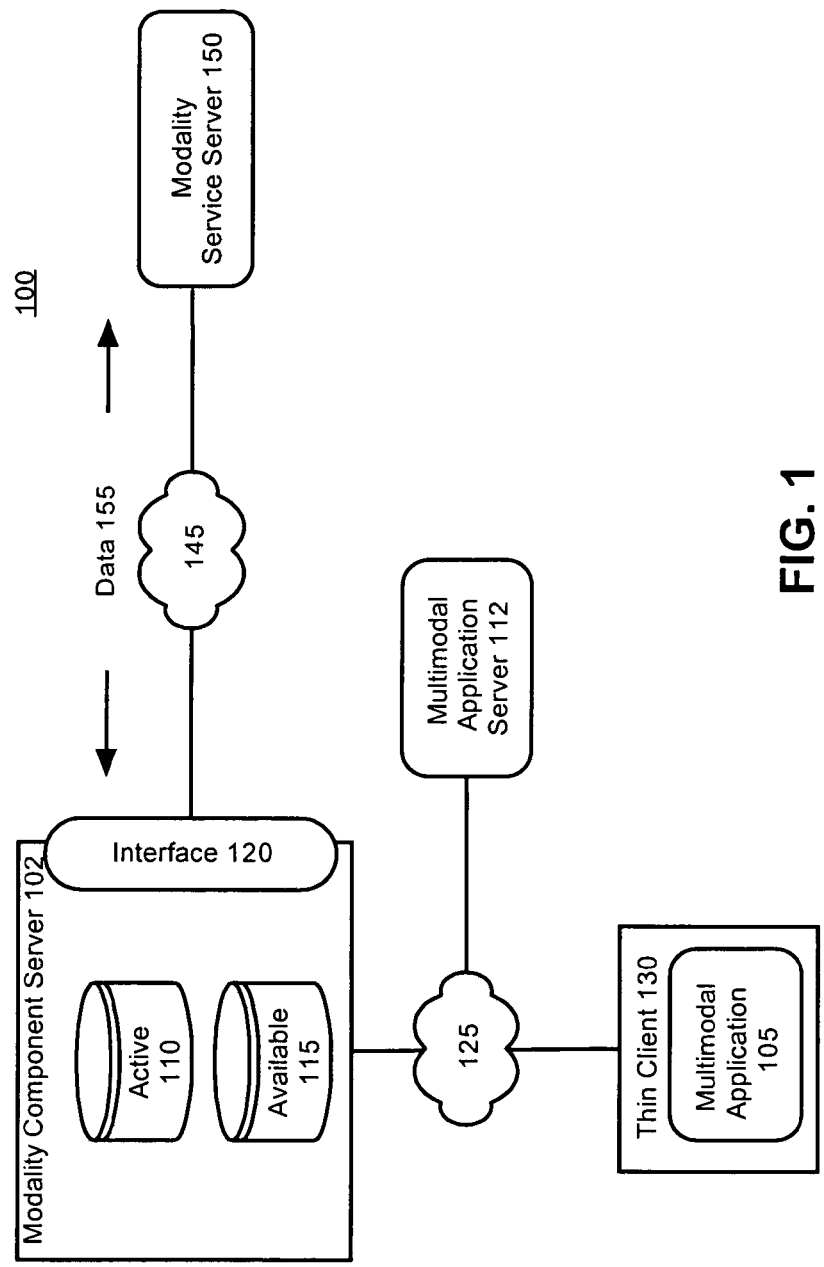
FIG. 1 is a schematic diagram illustrating a system for handling application modalities using dialog states of the application in accordance with the inventive arrangements disclosed herein.

FIG. 1 is a schematic diagram illustrating a system 100 for handling application modalities using dialog states of the application in accordance with the inventive arrangements disclosed herein. The system 100 can include a modality component server 102, a modality service server 150, a thin client 130, and a multimodal application server 112.

The thin client 130 can be a computing device of limited capabilities that can rely upon one or more backend servers to perform at least a portion of its processing tasks. The thin client 130 can be, for example, a personal data assistant (PDA), a cellular telephone, an electronic book, an electronic contact manager, a data tablet, and any other such computing device. The thin client 130 can lack sufficient resources to simultaneously enable a set of interface modalities supported by a multimodal application 105 operating upon the thin client 130. The thin client 130 can report the input modes that it supports to a modality component dedicated to the configuration of the device running the application. Information supplied by the thin client 130 can then be submitted to the modality component server 102. Those modality components that support the input modes supported by the device can be dynamically activated and deactivated by the modality component server 102 as needed.

Each modality can represent a particular input or output methodology. For example, graphical user interface (GUI) based modalities can include, but are not limited to, a keyboard input modality, a mouse selection modality, a screen touch modality, a visual display modality, and the like. Speech based modalities can include a speech input modality, a synthetic speech generation modality, a Dual Tone Multiple Frequency (DTMF) modality, and the like.

The multimodal application 105 can be a software application, which supports interactions via more than one modality. In one embodiment, the multimodal application 105 can by a stand-alone, local application residing upon the thin client 130. In another application, the multimodal application 105 can be a client-side module that interacts with the multimodal application server 112. The multimodal application server 112 can be a remotely located application that manages a portion of the processing tasks relating to the multimodal application 105. The multimodal application server 112 will typically be used in situations where resources directly provided by the thin client 130 are very limited compared to the computing resource required for application operations.

The modality component server 102 can manage a plurality of modalities that have been modularly implemented so that the functions and features for a particular modality can be contained within a specifically designed modality component. When a modality component is activated, the component can interact directly with the device for input recognition and output synthesis. Different modality components used by the modality component server 102 can be executed to interact with the device from different locations. For example, a modality component can be locally executed with respect to the modality component server 102, a modality component or portions thereof can be remotely executed upon the modality service server 150, and/or a modality component can be executed upon the thin client 130. The modality component server 102 can coordinate actions and events relating to the multimodal application 105, regardless of where the modality component is located.

The modality component server 102 can include a set of active modalities 110 and a set of available modalities 115 that are not presently active. The modality component server 102 can monitor interactive events that are specified within the active modalities 110 as well as events specified generally for the multimodal application 105. Further, the modality component server 102 can initiate appropriate programmatic actions when a monitored event occurs. One particular modality component that is typically active is the application module. The role of the application module is to monitor activation conditions, where an occurrence of one of the activation conditions can be detected based upon an application event. In one embodiment, the application module can be provided to the modality component server 102 by the multimodal application server 112. In another embodiment, the application module can be provided to the modality component server 102 by the multimodal application 105.

The modality service server 150 can assign modality processing tasks to a modality component from a remote location. The modality service server 150 can convey data 155 across a network 145 to the modality component server 102 and/or the multimodal application 105. In one embodiment, the modality service server 150 can provide a Web service for a specified modality component. The Web service can be, for example, a natural language comprehension service, a text-to-speech service, a language translation service, and the like.

In another embodiment, the modality service server 150 can include a multitude of functions available through remote procedure call (RPC) routines. It should be appreciated that the data 155 provided by the modality service server 150 can be conveyed in any of a variety of manners and the invention is not to be limited in this regard. For example, message queuing and advanced program-to-program communications (APPC) can be used to convey the data 155 to the multimodal application 105 and/or the modality component server 102. The interaction data transferred between the modality component and the device can also be encoded into a compression format.

In one embodiment, the modality component server 102 can include an interface 120 used to standardize data provided by different modality components and different modality service servers so that modality data can be handled in a unified fashion regardless of the location in which modality operations are actually executed. The interface 120 can define rules, data formats, parameters, and the like for complying with the architecture of the multimodal application 105 and/or the modality component server 102. Any of a variety of routines, libraries, data adaptors, networking mechanisms, and the like can be included within the interface 120 to facilitate the exchange of data.

For example, in one embodiment, the interface 120 can include an application program interface (API) defined for the multimodal application 105 and/or the modality component server 102. In another embodiment, the interface 120 can convert responses received from the modality service server 150 from a format native to the modality service server 150 to a format compatible with the multimodal application 105. In yet another embodiment, the interface 120 can include a plurality of protocol adaptors to establish network communications with the modality service server 150.

In operation, a multitude of modality components provided from different locations can register with the modality component server 102, thereby becoming available 115 modality components. One of these modality components can include an application module provided by the multimodal application server 102. When the modality component is registered, details for the modality component including links for activating a modality component and firing modality component routines can be specified. Registered modality components can include an application module provided by a multimodal application server 102 and device configuration module provided by the thin client 130. In one embodiment, the resource requirements specified within the application module and the resources available as specified through the device configuration module can be used by the modality component server 102 when selecting which available 115 modality components are to become active 110.

After modality components have been registered with the modality component server 102, the thin client 130 can instantiate the multimodal application 105. A multitude of available 115 modality components can become active 110 components for the application instance. An active 110 modality component is one having a multitude of software objects enabled, where each software object controls one or more modality tasks. Modality software objects can be placed in a shared memory area or "white board" of the modality component server 102. The different software objects within the shared memory area can be used to coordinate application interactions between the modality components.

For example, an initial modality component, such as a GUI modality component, can be activated based upon an initial dialogue state of the multimodal application 130. When activated within the modality component server 102, the GUI modality can be added to the active modalities 110 and events specified for the GUI modality component can be monitored. One or more GUI software objects provided by the GUI modality component can be enabled within the shared memory area. Data necessary to execute GUI modality functions for the multimodal application 105 can then be enabled upon the thin client 130. Enabling these GUI modality functions can involve adding software objects for the application to the shared memory area.

Input and output data relating to user interactions can be transferred between the thin client 130 and the modality component server 102. Each of these user interactions can be compared against activation conditions. The activation conditions can result from the various software objects of the various modality components being placed within the shared memory area. Activation conditions can by dynamically adjusted depending on which modality components are active at any point in time and which software objects have been enabled within the shared memory area.

For example, a user of the multimodal application 105 can select a button for enabling speech input. In this example, the thin client 130 can lack sufficient resource to simultaneously handle GUI modality operations and speech modality operations. When the button is selected, data can be conveyed informing the modality component server 102 of the button selection event. This event can be one of the monitored events that trigger a speech modality operation. The modality component server 102 can responsively deactivate the GUI modality component and responsively activate the speech modality component. Once the speech modality has been activated, speech input can be received by the speech modality component via the thin client 130 and appropriate processing performed. The completion of the speech modality tasks can result in a new dialogue state for the multimodal application 105. This new dialogue state can be conveyed to the modality component server 102, which can deactivate the speech modality component and activate the GUI modality component in accordance with the new dialogue state.

Figure 2:
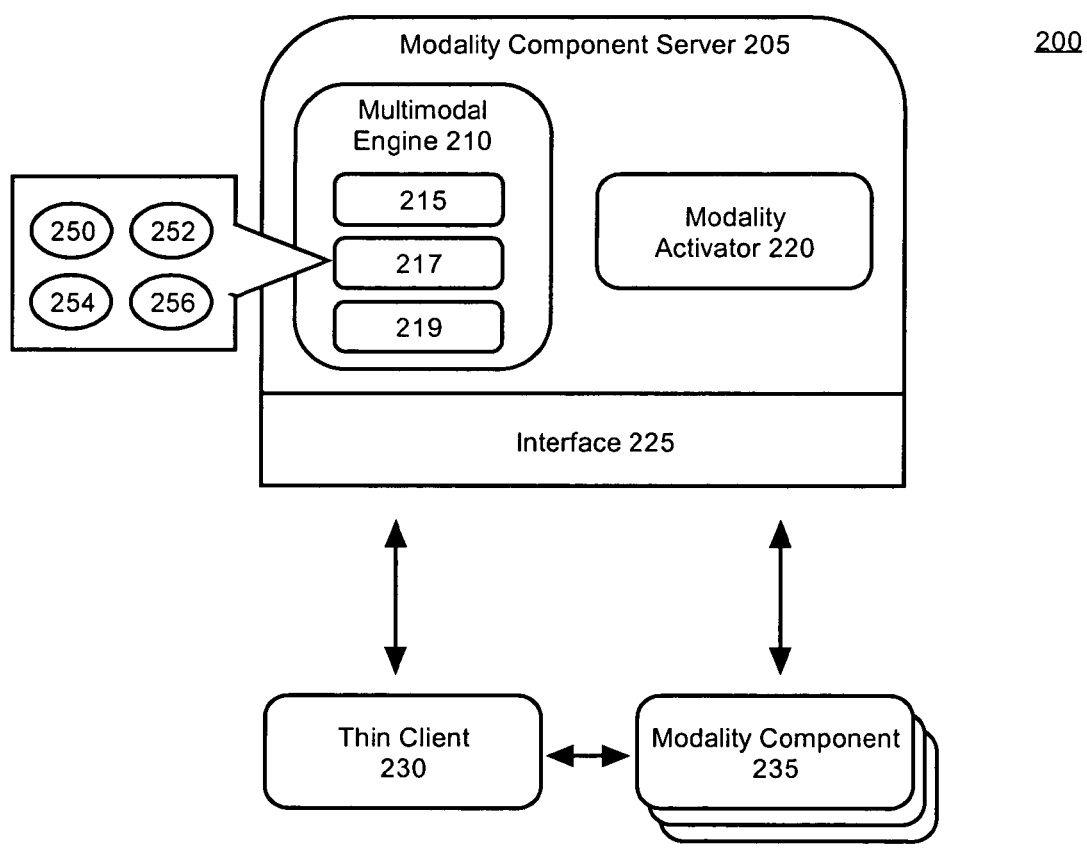
FIG. 2 is a schematic diagram illustrating a system for a multimodal application that manages distributed modality components in accordance with the inventive arrangements disclosed herein.

FIG. 2 is a schematic diagram illustrating a system 200 for a multimodal application that manages distributed modality components in accordance with the inventive arrangements disclosed herein. The system 200 can include a thin client 230, and at least one modality component 235, and a modality component server 205. The thin client 230 can possess the structural characteristics and functions ascribed to the thin client 130 of FIG. 1. In one embodiment, device specific information concerning the thin client 230 can be conveyed to the modality component dedicated to the device's configuration. This modality component in turn can convey the configuration data to the modality component server 205 so that suitable device specific parameters can be established and behavior of the modality component server 205 adjusted in a device specific manner.

The modality component 235 can be a modular software unit that handles interactions relating to a particular modality for a multimodal application executed upon the thin client 230. The modality component 235 can include, but is not limited to, a speech component, a handwriting component, a DTMF component, a keypad entry component, a GUI component, and the like. Collaborations can exist between different modality components 235. For example, a speech component can perform a speech recognition task resulting in a speech input being converted into textual output. The textual output can be displayed within a GUI text element, which is displayed using features of a GUI component. An application module can also be provided, which is also a modality component.

In another example, a GUI selection event controlled by a GUI component can result in the activation of a speech component. For example, a GUI button labeled "speech input" can be displayed within a screen of the modality component server 205. Selecting the button via a GUI selection action can toggle the modality component server 205 from a GUI modality to a speech modality. The speech modality can be handled by a speech component that receives a speech input, that automatically converts the speech to text, and that responsively performs one or more programmatic actions.

Each of the modality components 235 can be registered with the modality component server 205. Registration can provide the modality component server 205 with information necessary to dynamically activate the modality components 235 as needed. The modality component 235 can be local to the modality component server 205 and/or thin client 230 or the modality component 235 can be remotely located.

The modality component server 205 can be a software application, which supports coordinate interactions of a multimodal application running upon a resource restricted thin client 230. The modality component server 205 can include an interface 225, a multimodal engine 210, and a modality activator 220.

In one embodiment, the interface 225 can possess the structural characteristics and functions ascribed to the interface 120 of FIG. 1. The interface 225 can be used to facilitate the conveyance of interaction data between the thin client 230 and the modality component server 205 and can facilitate the conveyance of modal data between the modality component 235 and the thin client 230.

The modality activator 220 can be used to dynamically activate and/or deactivate the modality components 235 as appropriate. For example, the modality activator 220 can be listener within an event/listener pattern that can selectively activate and deactivate registered modality responsive to previously defined events. That is, the modality activator can function as a proxy responsively for managing activation operations of registered modality components.

The multimodal engine 210 can include an inference engine 215, a shared memory area 217, a rule data store 219, and an application engine. The shared memory area 217 can be a common memory space in which modality objects 250, 252, 254, and 256 are dynamically enabled as needed. Each of the modality objects can represent a software object provided by a specific modality component 235. Different activation conditions can be loaded into/removed from the multimodal engine 210 in accordance with the dialogue state of the application as specified by modality objects enabled within the shared memory area 217. When a modality component 235 is deactivated, the modality objects associated with the modality component 235 can be removed from the shared memory area 217.

When each modality object is placed with the shared memory area 217, a multitude of rules for that modality object can be specified in the rule data store 219. The rules can specify a multitude activation conditions that are to be monitored. Interaction events can trigger the firing of related application operations associated with specified activation conditions. The associated application operations can include operations performed by one or more modality components. When software objects are removed from the shared memory area 217, the rules specified for the software object can be removed from the rule data store 219. During the operation of the modality component server 205, different modality components 235 can be dynamically activated and deactivated, resulting in different software objects appearing in the shared memory area 217, which in turn results in different activation conditions being dynamically monitored by the multimodal engine 210 in accordance with the rules of the rule data store 219.

The inference engine 215 can list a number of application conditions that are to be run in response detection of the application events and rules established within the rules data store 219. An application event can be an assertion of new data, such as an interpretation of user input, by a multimodality component 235. For example, an application event can be an on-focus event or a mouse-click event resulting from a user interaction within a particular modality. The application event can also be a system event. For example, a system event can be triggered whenever the resources available to the modality component server 205 fall below a designated threshold. Such a resource shortage system event can trigger a modality deactivation action. Additionally, a system event can be a multimodal application 105 instantiation event, which can trigger the automatic registration of modality components 235 and the automatic activation of a default set of modalities. The modality component server 205 can update and modify the events data contained within inference engine 215 in accordance with the modality objects contained enabled within the shared memory area 217.

All active modality components 235 can assert one or more modality events within the list of the inference engine 215. Accordingly, the multimodal engine 210 can utilize the inference engine 215 to look-up events that are to be performed responsive to a detected interaction event relating to active modalities in accordance with the rules of the rule data store 219. That is, the multimodal engine 210 can detect the occurrence of events specified by active modality components and the appropriate responses for these events can be specified within the list of the inference engine 215. The responses listed in the inference engine 215 can sometimes result in the activation of a previously deactivated modality component and the execution of one or more methods provided by the newly activated modality component.

The application state engine can receive data about the current dialogue state of an application hosted on the thin client 230, which drives the interactions and modalities of the application. For instance, each dialogue state can define the modality objects that are to be placed in the shared memory area 217. Accordingly, the rules in the rule data store 219 and the activation conditions and events specified by the inference engine 215 can be driven by the dialogue state of the application. Consequently, the application state engine can cause different modality components to be activated and/or deactivated based upon previously established criteria of the application dialogue states. In one embodiment, the application state engine can include an administration interface that permits an authorized administrator to adjust the modalities, the activation conditions, and the programmatic actions linked to activation conditions associated with various application dialogue states.

Figure 3:
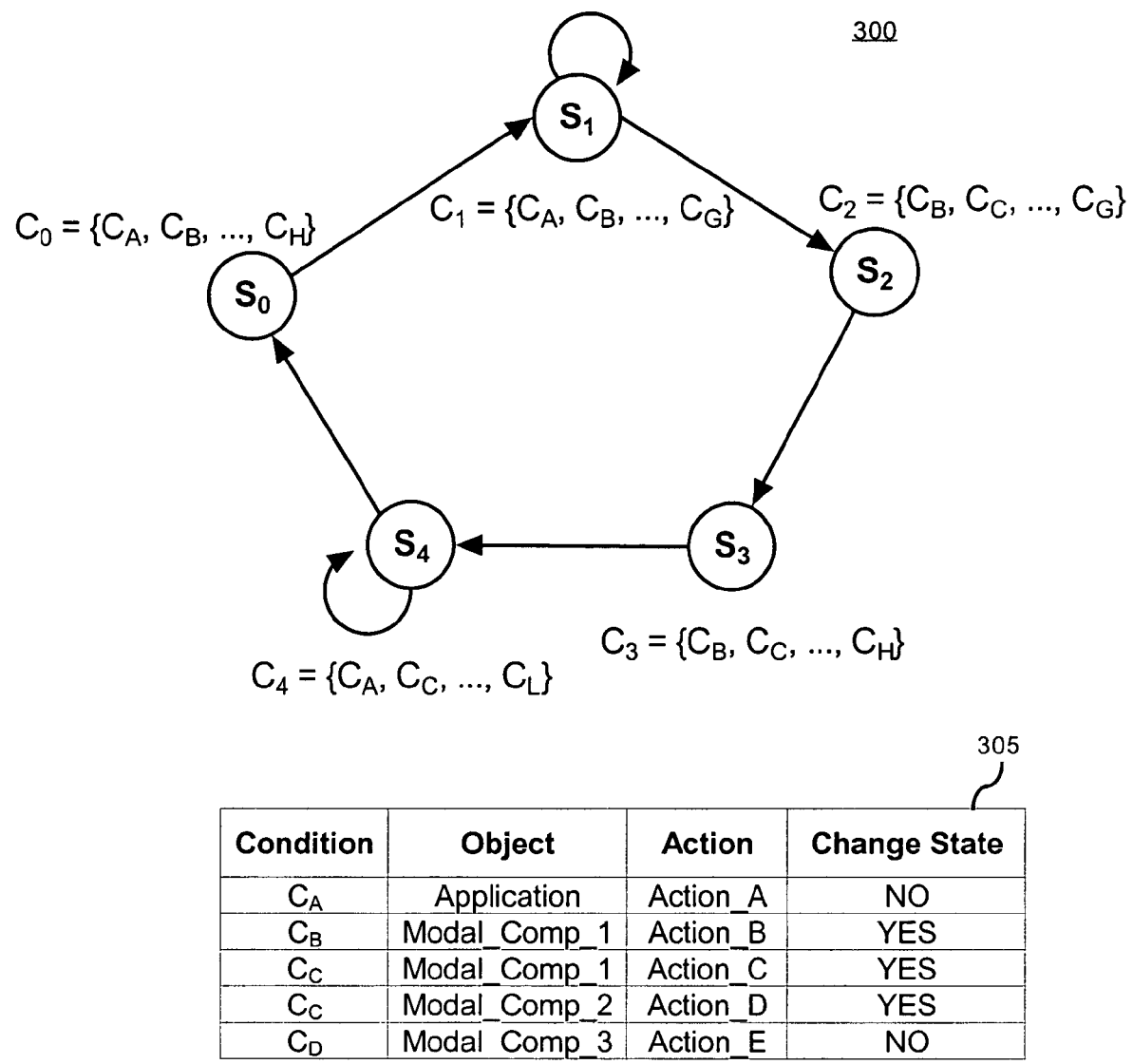
FIG. 3 is a schematic diagram illustrating a plurality of dialog states of an application in accordance with the inventive arrangements disclosed herein.

FIG. 3 is a schematic diagram 300 illustrating a plurality of dialog states of an application and a table 305 associating actions with conditions. The diagram 300 and table 305 can be utilized in accordance with the inventive arrangements disclosed herein.

Diagram 300 illustrates five different application dialogue states, $S_0$, $S_1$, $S_2$, $S_3$, and $S_4$. In one embodiment, the modality component server 205 of FIG. 2 can manage the changes depicted in diagram 300. A dialogue state can be an application state resulting from predetermined user interactions. Different user selectable options can be presented in each application dialogue state. Selection of each of these options can result in one or more programmatic actions being initiated. The execution of different programmatic actions can result in a change in the dialogue state of the application. Only certain dialogue states can be reached from other dialogue states depending on the changes that occur within a dialogue state. In diagram 300, $S_0$ can transition to $S_1$; $S_1$ can loop within $S_1$ or can transition to $S_2$; $S_2$ can transition to $S_3$; $S_3$ can transition to $S_4$; and, $S_4$ can loop within $S_4$ or can transition to $S_0$.

Each dialogue state has an associated condition set detailing activation conditions for the corresponding state. The conditions sets for $S_0$, $S_1$, $S_2$, $S_3$, and $S_4$ are $C_0$, $C_1$, $C_2$, $C_3$, and $C_4$, respectively. Each condition set can consist of a plurality of conditions. The conditions of the condition set can be loaded into a shared memory area of a modality manager, whenever the application is in the related dialogue state. In diagram 300, condition set $C_0$ can include the activation conditions of $C_A$, $C_B$, $C_C$, $C_D$, $C_E$, $C_F$, $C_G$, and $C_H$. Additionally, $C_1$ can include $C_A$, $C_B$, $C_C$, $C_D$, $C_E$, $C_F$, and $C_G$; $C_2$ can include $C_B$, $C_C$, $C_D$, $C_E$, $C_F$, and $C_G$; $C_3$ can include $C_B$, $C_C$, $C_D$, $C_E$, $C_F$, $C_G$, and $C_H$ and $C_H$; and, $C_4$ can include $C_A$, $C_C$, $C_D$, $C_E$, $C_F$, $C_G$, $C_H$, $C_I$, $C_J$, $C_K$, and $C_L$.

In one embodiment, the table 305 can be used to initiate programmatic actions when an activation condition is detected. The initiated actions can be initiated within the application as well as within a multitude of modality components which may be remotely located. Further, the table 305 can indicate whether the completion of a particular action can result in a dialogue state change.

According to table 305, when condition $C_A$ is detected, Action_A can be initiated with the multimodal application. No dialogue state change can result from the execution of Action_A. Condition $C_B$ can initiate an Action_B within a Modal_Component_1, which does result in a dialogue state change. $C_C$ can initiate two programmatic actions, one from within Modal_Component_1 and the other from within Modal_Component_2. $C_D$ can initiate remotely located Modal_Component_3 to perform a programmatic action designated Action_E. It should be appreciated by one of ordinary skill in the art that FIG. 3 is for illustrative purposes only and that the invention is not to be limited to the particular implementation details presented therein.

Figure 4:
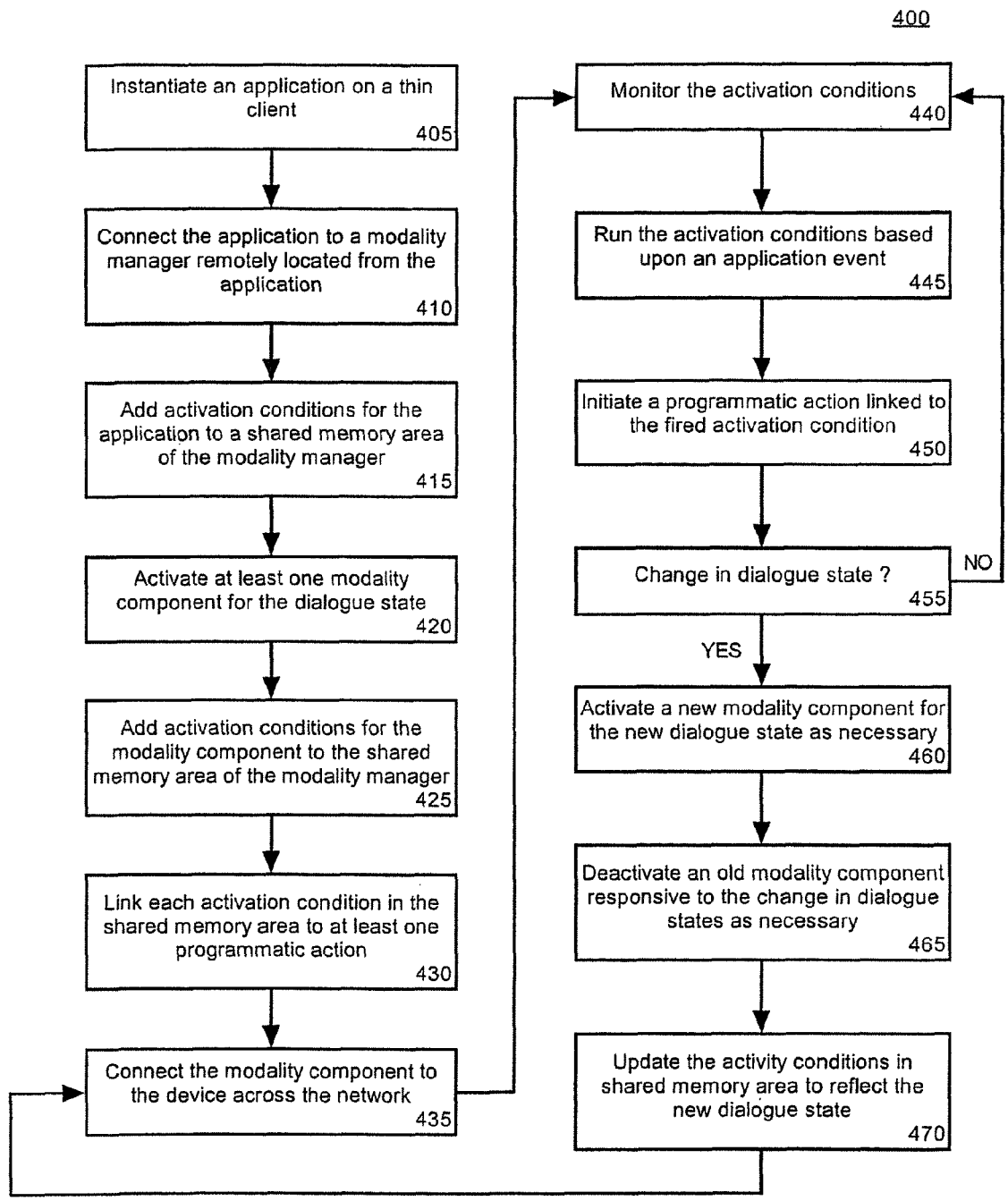
FIG. 4 is flow chart illustrating a method for handling application modalities using dialog states of the application in accordance with the inventive arrangements disclosed herein.

FIG. 4 is flow chart illustrating a method 400 for handling application modalities using dialog states of the application in accordance with the inventive arrangements disclosed herein. The method 400 can be performed in the context of a multimodal application that handles modalities in a modular fashion using multiple modality components. Modality interaction with a device can be performed by the modality components that can be distributed across a network. Additionally, the multimodal application can be disposed within a thin client that has limited resource capabilities. Different modality components can be dynamically activated and deactivated as needed.

The method can begin in step 405, where an application can be instantiated on a thin client. In step 410, the application can be communicatively connected to a modality manager remotely located from the application. The modality manager can function as a centralized location that coordinates application events and modal actions of different modality components. In one embodiment, the modality manager can function as a modality component server and the multimodal client can function as a modality component client. In step 415, activation conditions related to the application can be added to a shared memory area of the modality manager. This shared memory area can be a centralized location used to coordinate the interactions of the application.

In step 420, at least one modality component can be activated for the dialogue state. In step 425, activation conditions specified for the newly activated modality component can be added to the shared memory area of the modality manager. In step 430, each activation condition in the shared memory area can be linked to at least one programmatic action. For example, a lookup table can list the programmatic actions that are to be triggered upon the detection of each activation condition. In step 435, the modality component can be connected directly to the device. In step 440, the activation conditions contained in the shared memory area can be monitored by the modality manager.

In step 445, the activation conditions can be run in response to an application event, such as a button selection event and/or a keyboard entry. In step 450, a programmatic action can be initiated based upon a fired activation condition. The programmatic action can be executed by a software routine local to the thin client or can be performed by one or more remotely located software routines. Remotely located software routines can include Web services and RPC routines.

In step 455 a determination can be made as to whether the dialogue state has changed or not. It should be appreciated that the dialogue state of the application can change responsive to the execution of the programmatic action. A new dialog state can occur if the set of activation conditions has been updated. If no state change has occurred, the method can loop back to step 440, where the modality manager can continue to monitor for activation conditions. If a state change is determined in step 455, the modality manager and included memory space can be updated to reflect the new dialogue state. It should be appreciated that each dialogue state can have a particular set of modality components that are active as well as a particular set of application specific activation conditions.

Specifically, in step 460, one or more new modality components can be activated for the new dialogue state, as necessary. In step 465, one or more old modality components that are not needed according to the new dialogue state can be deactivated. In step 470, the activity conditions in the shared memory area can be updated so that the modality manager can proper monitor the activity conditions relating to the presently active modality components. After the shared memory area has been updated to reflect the new dialogue state, the method can continue to step 435, where appropriate programmatic actions can be linked to the activation conditions.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A method of managing a multimodal application executing at least in part on a client device, the client device communicating with at least one server device, the client device being configured to accept input from a user via a plurality of modalities, the method comprising:

detecting, with at least one control module, that input from a user via one or more modalities has been interpreted by at least one first software module;

in response to interpretation of the input, activating, with the at least one control module, at least one second software module to process further input from the user, the at least one second software module being configured to, when executed by at least one processor of the at least one server device, cause the at least one processor to perform a task for processing the further input from the user, the task resulting in a change of a dialog state of the multimodal application from a first dialog state to a second dialog state; and receiving a notification at the at least one control module, output by the at least one second software module following performance of the task, that the dialog state of the multimodal application is to change from the first dialog state to the second dialog state, the notification received by the control module identifying the second dialog state to which the dialog state of the multimodal application is to change.

2. The method of claim 1, further comprising:

registering the at least one second software module with the at least one control module, the registering comprising identifying at least one condition on which the at least one second software module is to be activated; and in response to detecting that the input from the user has been interpreted, determining, with the at least one control module, whether the interpretation of the input by the at least one first software module meets the at least one condition on which the at least one second software module is to be activated, wherein the activating the at least one second software module comprises activating the at least one second software module in response to determining that the interpretation of the input meets the at least one condition.

3. The method of claim 1, further comprising:

receiving the further input from the user via one or more of the plurality of modalities; and with the at least one control module, triggering execution of the at least one second software module to cause the at least one processor to perform the task for processing the further input, wherein triggering the execution comprises providing the further input to the at least one second software module.

4. The method of claim 3, further comprising:

monitoring, with the at least one control module, for a notification from the at least one second software module that the further input from the user has been interpreted by the at least one second software module; and in response to the dialog state of the multimodal application changing to the second dialog state as a result of the performance of the task, activating, with the at least one control module, at least one third software module to process third input from the user, the at least one third software module being configured to, when executed by the at least one processor, cause the at least one processor to perform a second task for processing the third input from the user, the second task resulting in a change of a dialog state of the multimodal application from the second dialog state to a third dialog state.

5. The method of claim 4, further comprising:

in response to the dialog state of the multimodal application changing to the third dialog state, deactivating, with the at least one control module, the at least one second software module.

6. The method of claim 4, further comprising:

monitoring, with the at least one control module, for a notification of occurrence of at least one of a set of events, each event in the set of the events being associated with a programmatic action to be performed on occurrence of the event; and wherein the activating the at least one second software module comprises adding at least one event to the set of events, the at least one event comprising an interpretation of the further input from the user and a change of a dialog state of the multimodal application from the first dialog state to a second dialog state, the programmatic action associated with the interpretation of the input being activation of the at least one third software module.

7. The method of claim 1, wherein the activating the at least one second software module comprises instantiating the at least one second software module.

8. The method of claim 1, wherein the activating the at least one software module comprises activating a server-side module on the at least one server device and activating a client-side module on the client device, the server-side module being configured to communicate with the client-side module to receive the further input from the user and to perform the task.

9. At least one non-transitory computer-readable storage medium having encoded thereon computer-executable instructions that, when executed by at least one processor, cause the at least one processor to carry out a method of managing a multimodal application executing at least in part on a client device, the client device communicating with at least one server device, the client device being configured to accept input from a user via a plurality of modalities, the method comprising:

detecting, with at least one control module, that input from a user via one or more modalities has been interpreted by at least one first software module;

in response to interpretation of the input, activating, with the at least one control module, at least one second software module to process further input from the user, the at least one second software module being configured to, when executed by at least one processor of the at least one server device, cause the at least one processor to perform a task for processing the further input from the user, the task resulting in a change of a dialog state of the multimodal application from a first dialog state to a second dialog state; and receiving a notification at the at least one control module, output by the at least one second software module following performance of the task, that the dialog state of the multimodal application is to change from the first dialog state to the second dialog state, the notification received by the control module identifying the second dialog state to which the dialog state is to change.

10. The at least one computer-readable storage medium of claim 9, wherein the method further comprises:

registering the at least one second software module, the registering comprising identifying at least one condition on which the at least one second software module is to be activated; and in response to detecting that the input from the user has been interpreted, determining whether the interpretation of the input by the at least one first software module meets the at least one condition on which the at least one second software module is to be activated, wherein the activating the at least one second software module comprises activating the at least one second software module in response to determining that the interpretation of the input meets the at least one condition.

11. The at least one computer-readable storage medium of claim 9, wherein the method further comprises:

receiving the further input from the user via one or more of the plurality of modalities; and triggering execution of the at least one second software module to cause the at least one processor to perform the task for processing the further input, wherein triggering the execution comprises providing the further input to the at least one second software module.

12. The at least one computer-readable storage medium of claim 9, wherein the method further comprises:

monitoring for a notification from the at least one second software module that the further input from the user has been interpreted by the at least one second software module; and in response to the dialog state of the multimodal application changing to the second dialog state as a result of the performance of the task, activating at least one third software module to process third input from the user, the at least one third software module being configured to, when executed by the at least one processor, cause the at least one processor to perform a second task for processing the third input from the user, the second task resulting in a change of a dialog state of the multimodal application from the second dialog state to a third dialog state.

13. The at least one computer-readable storage medium of claim 12, wherein the method further comprises:

in response to the dialog state of the multimodal application changing to the third dialog state, deactivating the at least one second software module.

14. An apparatus comprising:

at least one processor; and at least one storage medium having encoded thereon executable instructions that, when executed by the at least one processor, cause the at least one processor to carry out a method of managing a multimodal application executing at least in part on the client device, the client device communicating with at least one server device, the client device being configured to accept input from a user via a plurality of modalities, the method comprising:

detecting, with at least one control module, that input from a user via one or more modalities has been interpreted by at least one first software module;

in response to interpretation of the input, activating, with the at least one control module, at least one second software module to process further input from the user, the at least one second software module being configured to, when executed by at least one processor of the at least one server device, cause the at least one processor to perform a task for processing the further input from the user, the task resulting in a change of a dialog state of the multimodal application from a first dialog state to a second dialog state; and receiving a notification at the at least one control module, output by the at least one second software module following performance of the task, that the dialog state of the multimodal application is to change from the first dialog state to the second dialog state, the notification received by the control module identifying the second dialog state to which the dialog state is to change.

15. The apparatus of claim 14, wherein the method further comprises:

registering the at least one second software module, the registering comprising identifying at least one condition on which the at least one second software module is to be activated; and in response to detecting that the input from the user has been interpreted, determining whether the interpretation of the input by the at least one first software module meets the at least one condition on which the at least one second software module is to be activated, wherein the activating the at least one second software module comprises activating the at least one second software module in response to determining that the interpretation of the input meets the at least one condition.

16. The apparatus of claim 14, wherein the method further comprises:

receiving the further input from the user via one or more of the plurality of modalities; and triggering execution of the at least one second software module to cause the at least one processor to perform the task for processing the further input, wherein triggering the execution comprises providing the further input to the at least one second software module.

17. The apparatus of claim 14, wherein the method further comprises:

monitoring for a notification from the at least one second software module that the further input from the user has been interpreted by the at least one second software module; and in response to the dialog state of the multimodal application changing to the second dialog state as a result of the performance of the task, activating at least one third software module to process third input from the user, the at least one third software module being configured to, when executed by the at least one processor, cause the at least one processor to perform a second task for processing the third input from the user, the second task resulting in a change of a dialog state of the multimodal application from the second dialog state to a third dialog state.

18. The apparatus of claim 17, wherein the method further comprises:

in response to the dialog state of the multimodal application changing to the third dialog state, deactivating the at least one second software module.

19. The apparatus of claim 14, wherein the apparatus is the at least one server device and the at least one processor is the at least one processor of the server device.

* * * * *